US011866986B2

(12) United States Patent
Waschk

(10) Patent No.: US 11,866,986 B2
(45) Date of Patent: Jan. 9, 2024

(54) DAMPER

(71) Applicant: Druck— und Spritzgusswerk Hettich GmbH & Co. KG, Frankenberg (DE)

(72) Inventor: Stefan Waschk, Lahntal-Caldern (DE)

(73) Assignee: DRUCK— UND SPRITZGUSSWERK HETTICH GMBH & CO. KG, Frankenberg (DE)

( * ) Notice: Subject to any disclaimer, the term of this patent is extended or adjusted under 35 U.S.C. 154(b) by 536 days.

(21) Appl. No.: 16/973,942

(22) PCT Filed: Jun. 4, 2019

(86) PCT No.: PCT/EP2019/064488

§ 371 (c)(1),
(2) Date: Dec. 10, 2020

(87) PCT Pub. No.: WO2020/001936

PCT Pub. Date: Jan. 2, 2020

(65) Prior Publication Data

US 2021/0246703 A1 Aug. 12, 2021

(30) Foreign Application Priority Data

Jun. 26, 2018 (DE) ..................... 20 2018 103 637.8

(51) Int. Cl.
*E05F 5/02* (2006.01)
*E05F 5/10* (2006.01)

(52) U.S. Cl.
CPC .................. *E05F 5/02* (2013.01); *E05F 5/10* (2013.01); *E05Y 2201/21* (2013.01); *E05Y 2201/256* (2013.01); *E05Y 2201/264* (2013.01); *E05Y 2900/20* (2013.01)

(58) Field of Classification Search
None
See application file for complete search history.

(56) References Cited

U.S. PATENT DOCUMENTS

| | | | | |
|---|---|---|---|---|
| 8,668,062 B2 | 3/2014 | Weber | | |
| 2012/0200018 A1* | 8/2012 | Paz | ........................ | A47C 7/027 267/166.1 |

FOREIGN PATENT DOCUMENTS

| | | | | |
|---|---|---|---|---|
| CN | 105020331 A * | 11/2015 | .............. | F16F 1/025 |
| DE | 2623873 A1 | 12/1977 | | |
| DE | 2555062 C2 * | 4/1984 | | |
| DE | 19828648 A1 * | 2/1999 | ........... | A47C 23/002 |
| DE | 102007031175 B3 | 10/2008 | | |
| DE | 102013001650 A1 | 7/2014 | | |

(Continued)

OTHER PUBLICATIONS

International Search Report for PCT/EP2019/064488 dated Sep. 27, 2019 (with English translation).

*Primary Examiner* — Melanie Torres Williams
(74) *Attorney, Agent, or Firm* — Collard & Roe. P.C.

(57) ABSTRACT

A damper, in particular for fittings for furniture or household appliances, has a housing in which a piston connected to a piston rod is guided in a linearly displaceable manner in an interior space. At least one flow channel is formed on or in the piston, through which the flow passes when the piston is displaced. A volume-compensation element is provided in the housing, which compensates for a volume which is displaced or released when a part of the piston rod is pushed into or pulled out of the housing, being displaceably mounted in the housing.

8 Claims, 3 Drawing Sheets

(56) References Cited

FOREIGN PATENT DOCUMENTS

| | | | | | |
|---|---|---|---|---|---|
| EP | 2006480 | A1 | | 12/2008 | |
| EP | 2730735 | A1 | | 5/2014 | |
| EP | 3358116 | A1 | | 8/2018 | |
| WO | WO-2005048781 | A2 | * | 6/2005 | ........... A47C 23/002 |

* cited by examiner

DAMPER

CROSS REFERENCE TO RELATED APPLICATIONS

This application is the National Stage of PCT/EP2019/064488 filed on Jun. 4, 2019, which claims priority under 35 U.S.C. § 119 of German Application No. 20 2018 103 637.8 filed on Jun. 26, 2018, the disclosures of which are incorporated by reference. The international application under PCT article 21(2) was not published in English.

BACKGROUND OF THE INVENTION

The present invention relates to a damper, in particular for fittings for furniture or household appliances, comprising a housing in which a piston connected to a piston rod is guided in a linearly displaceable manner in an interior space, wherein at least one flow channel is formed on or in the piston, through which the flow passes when the piston is displaced, wherein a volume-compensation element is provided in the housing, which compensates for a volume which is displaced or released when a part of the piston rod is pushed into or pulled out of the housing, being displaceably mounted in the housing.

EP 2 006 480 B1 reveals a damper in which a piston connected to a piston rod is displaceably arranged in a cylindrical housing. The damping forces are generated by the flow resistance when the piston is displaced within the housing and a fluid flows through a flow channel on the piston. When the piston rod is pushed into the housing, a volume of the fluid is displaced, so that for compensation a displaceable volume-compensation element is provided, which has an annular seal, which is mounted on a retaining ring, which is pretensioned into the housing by a spring. This design of the damper is disadvantageous particularly in the area of the volume-compensation element, as the assembly and manufacture of the individual components is complex.

SUMMARY OF THE INVENTION

It is therefore the object of the present invention to create a damper that is simple in design and easy to assemble.

This object is solved with a damper with the features of claim 1. Advantageous designs are disclosed in the subclaims.

In the damper according to the invention, a volume-compensation element is provided which is displaceably mounted in the housing by pushing or pulling a part of the piston rod into or out of the housing, wherein the volume-compensation element is held on a cover of the damper which closes the housing at one end and forms a through-opening for the piston rod. This allows the volume-compensation element to be mounted together with the cover, for example by pushing it into the housing.

Preferably, the volume-compensation element is formed integrally with the cover. An integral design leads to a reduction in the number of components, wherein at least one web can be arranged between the volume-compensation element and the cover, which allows the volume-compensation element to move in the axial direction of the housing, while the cover remains rigidly fixed to the housing. Such webs can, for example, be designed in a spiral-shaped manner in order to displaceably mount the volume-compensation element by a bending or torsional movement. The volume-compensation element can optionally also be rotated during the sliding movement, especially if the bars are arranged in a spiral shape.

An annular sealing element is preferably provided on the volume-compensation element, which rests on an inner side of the housing and/or on the piston rod. The annular sealing element can either be fixed as a separate component to the volume-compensation element, or it can also be designed integrally with the volume-compensation element. The volume-compensation element can, for example, be designed as an injection-molded part, so that an elastic sealing element can be produced by using suitable thin-walled flexible plastics.

To guide the piston rod, a sleeve can be provided on the cover to surround the piston rod. In this case, the sleeve may protrude axially from the essentially disc-shaped cover, preferably outwards away from the housing. Optionally, the sleeve can also protrude inwards into the housing, in particular if the damper is to be used in confined spaces.

The invention is explained in more detail below by means of an exemplary embodiment with reference to the attached drawings, wherein:

BRIEF DESCRIPTION OF THE DRAWING FIGURES

DETAILED DESCRIPTION OF THE INVENTION

Figure 1A:
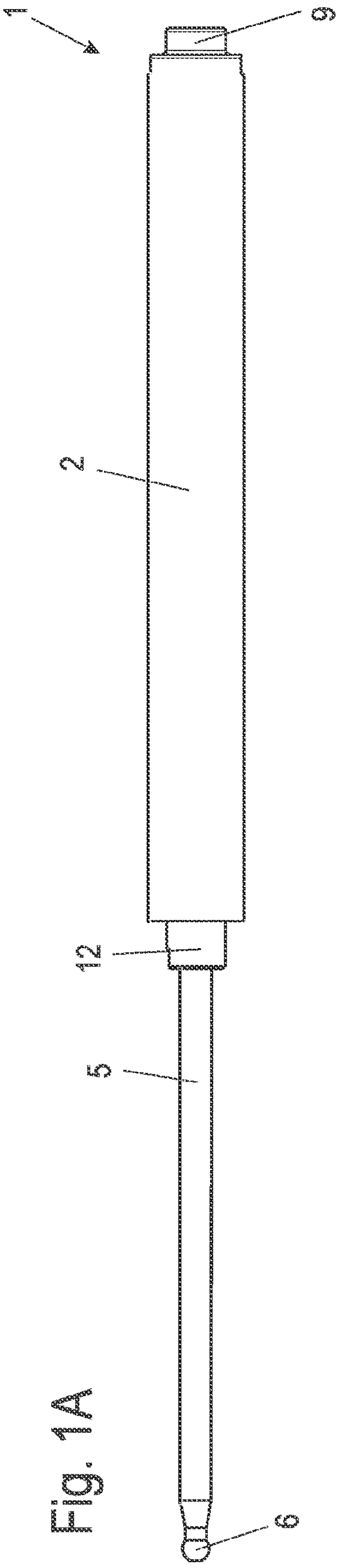
FIGS. 1A and 1B show two views of the damper according to the invention with extended piston rod.

A damper 1 comprises a housing 2 and a piston rod 5 protruding from the housing 2. The housing 2 has in an interior space 20 a cylindrical section 4 on which a piston 10 is displaceably guided. A widening 11 or a tapering section can optionally be provided on the cylindrical section 4 to change the damping forces at different areas of housing 2. In the exemplary embodiment shown, a widening 11 is provided adjacent to the base 3, so that the piston 10 can be moved more smoothly in the area adjacent to the base 3 than on the cylindrical section 4 on the other side of the widening 11. It is also possible to dispense with such a widening 11 and to form the cylindrical section 4 essentially continuously with the same inner diameter.

The piston 10 is held on the piston rod 5, which can be connected at one end 6 outside the housing 2 to an actuating part. The end 6 is designed as a ball head and can also have other mechanical connecting means. An opposite end 7 is arranged in the housing 2 and can be inserted in an end position in a receptacle 8 at the base 3. Furthermore, on the base 3 a sleeve 9 is formed, which protrudes outwards from the housing 2 and is used to attach the housing 2 to a component, for example a fitting for furniture or household appliances.

The housing 2 is closed on the side opposite to the base 3 by an annular cover 13, which is held stationary on the housing 2 and can optionally be glued or welded thereto. On the cover 13 a through-opening for the piston rod 5 is formed, wherein a sleeve 12 protrudes outwards from the essentially disc-shaped cover 13 to guide the piston rod 5.

Figure 1B:
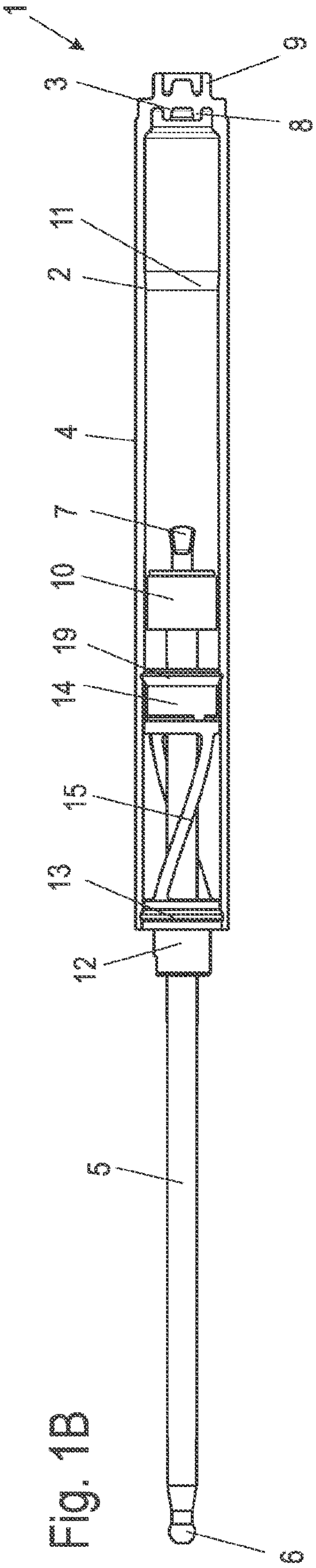
Figure 2A:
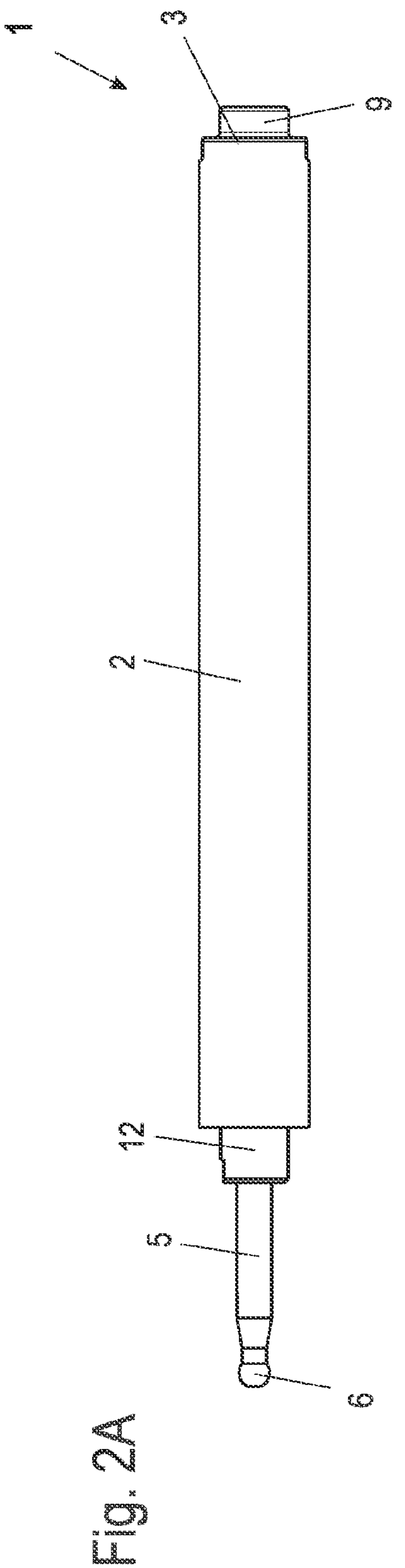
FIGS. 2A and 2B show two views of the damper of FIGS. 1A and 1B with retracted piston rod.
Figure 2B:
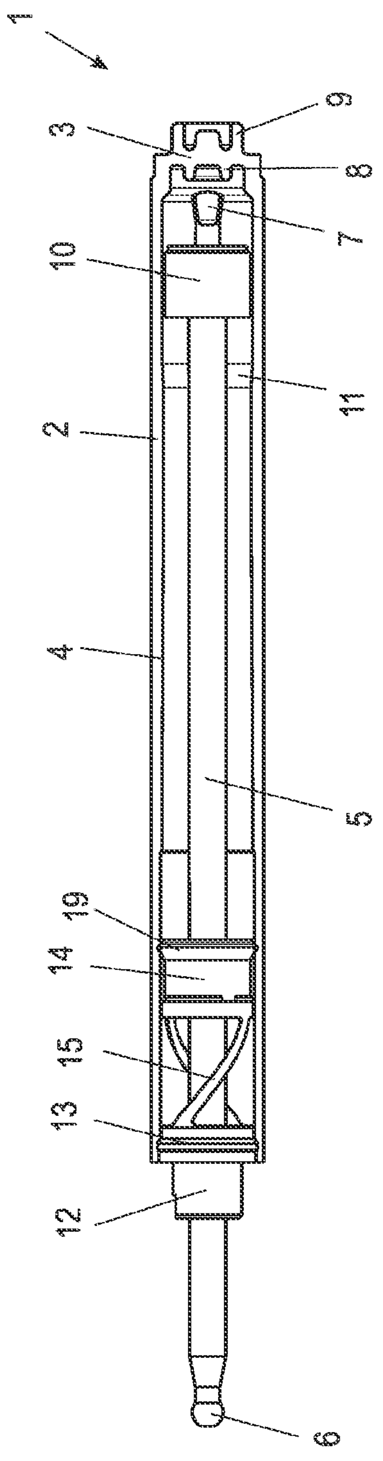

Furthermore, a volume-compensation element 14 is held on the cover 13 and can be displaced in the housing 2. As FIGS. 1B and 2B show, by pushing the piston rod 5 into the housing 2, the fluid can flow through the piston 10 to generate the damping forces, wherein pushing in the piston rod 5 partially displaces the fluid volume, which is compensated by moving the volume-compensation element 14. In this case, the volume-compensation element 14 is held on the cover 13 by struts or webs 15, wherein the webs 15 are bendable. Furthermore, a seal 19 is arranged or integrally formed on the volume-compensation element 14, which provides a seal between the volume-compensation element 14 and an inner wall of the housing 2. Optionally, the seal 19 can also provide a seal against the piston rod 5.

Figure 3:
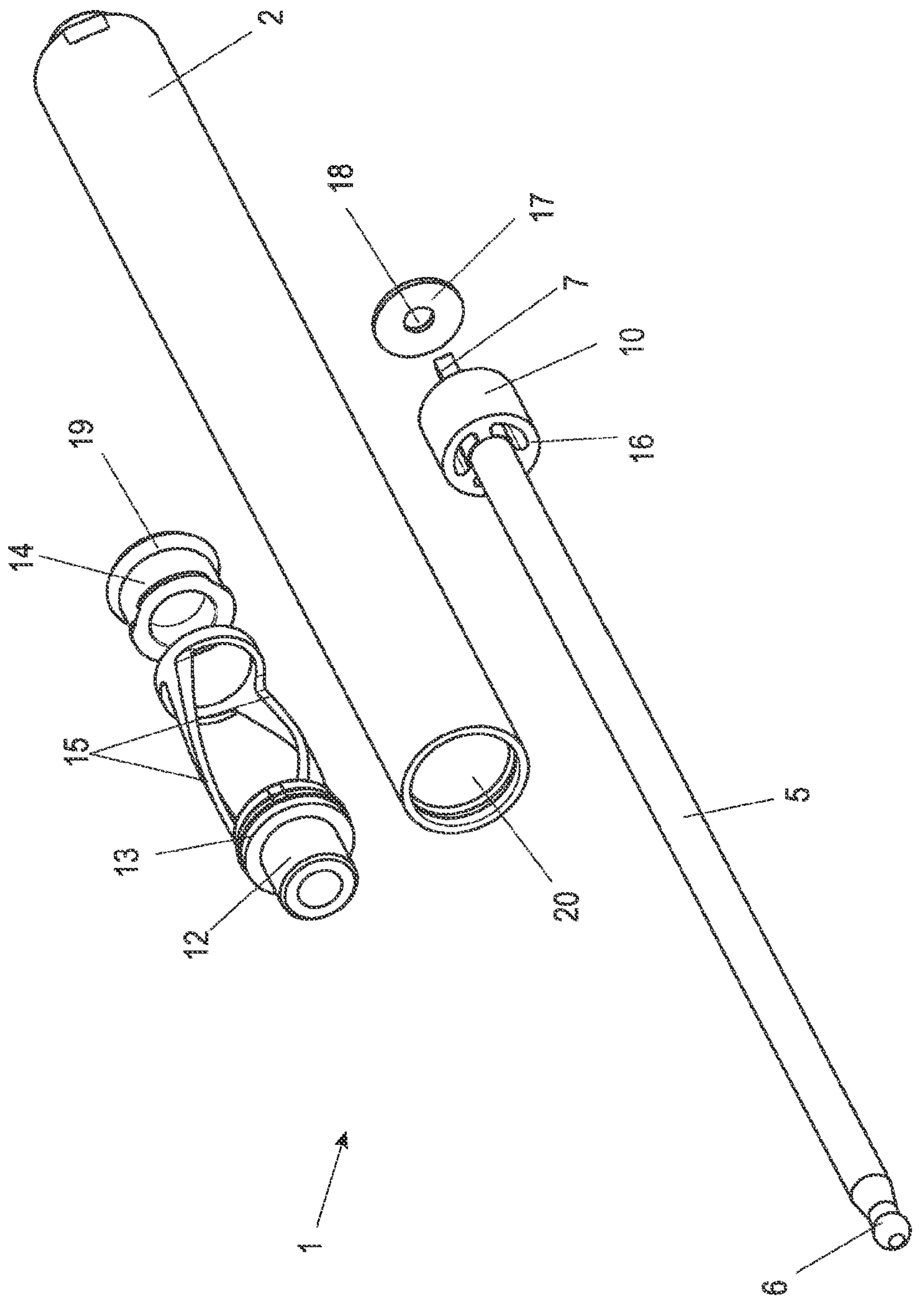
FIG. 3 shows a perspective exploded view of the damper in FIGS. 1A and 1B.

FIG. 3 shows an exploded view of the damper 1 according to the invention. The piston 10 is held on the piston rod 5 in an axially immovable position, wherein the piston rod 5 can be formed in a stepped manner for this purpose. Optionally, the piston can also be designed integrally with the piston rod. One or more flow channels 16 are formed on the piston 10, which can be closed at the end side by an annular throttling element 17. The throttling element 17 can be formed by an elastic ring which has a through-opening 18 for the piston rod 5. This allows the throttling element 17 to lift off the flow channels 16 when the piston rod 5 is pulled out, so that the piston rod 5 can be pulled out smoothly. In the opposite direction, when pushing in the piston rod 5, however, the throttling element 17 is pressed onto the flow channels 16 and thus provides a flow resistance which generates the damping forces.

The volume-compensation element 14 is connected to the cover 13 via webs 15, which are arranged in a spiral. Instead of two webs 15, it is also possible to provide only one web or more than two webs 15.

The volume-compensation element 14 can optionally be designed integrally with the webs 15 and the cover 13, for example as an injection-molded part. The seal 19 can also be produced by integrally formed sealing lips, wherein the seal can optionally also be formed as a separate component.

LIST OF REFERENCE NUMERALS

1 Damper
2 Housing
3 Base
4 Cylindrical section
5 Piston rod
6 End
7 End
8 Receptacle
9 Sleeve
10 Piston
11 Widening
12 Sleeve
13 Cover
14 Volume-compensation element
15 Web
16 Flow channel
17 Throttling element
18 Passage opening
19 Seal
20 Interior space

What is claimed is:

1. A damper (1) for fittings for furniture or household appliances, comprising a housing (2) in which a piston (10) connected to a piston rod (5) is guided in a linearly displaceable manner in an interior space (20), wherein at least one flow channel (16) is formed on or in the piston (10), through which flow channel (16) flow passes when the piston (10) is displaced, wherein a volume-compensation element (14) arranged in the housing (2) is provided, which compensates for a volume which is displaced or released when a part of the piston rod (5) is pushed into or pulled out of the housing (2), being displaceably mounted in the housing (2), wherein the volume-compensation element (14) is held on a cover (13) which closes the housing (2) at one end and forms a through-opening for the piston rod (5), wherein the volume-compensation element (14) is connected to the cover by at least one bendable web (15) and wherein the volume compensation element (14), the at least one bendable web (15) and the cover (13) are formed integrally in one piece.

2. The damper according to claim 1, wherein the volume-compensation element (14) has an annular sealing element (19) which rests against an inner wall of the housing (2).

3. The damper according to claim 1, wherein the at least one bendable web (15) is spirally aligned in the longitudinal direction of the housing (2).

4. The damper according to claim 1, wherein two webs (15) are provided which connect the volume-compensation element (14) to the cover (13).

5. The damper according to claim 1, wherein the cover (13) has a sleeve (12) for guiding the piston rod (5).

6. The damper according to claim 5, wherein the sleeve (12) protrudes outwardly from the housing (2) and the cover (13) in the longitudinal direction of the housing (2).

7. The damper according to claim 1, wherein the volume-compensation element (14), the cover (13) and at least one web (15) connecting the cover (13) to the volume-compensation element (14) are produced as an injection-molded part from plastic.

8. A fitting for a pull-out guide having a damper according to claim 1.

* * * * *